(12) United States Patent
Chang et al.

(10) Patent No.: US 6,751,599 B2
(45) Date of Patent: Jun. 15, 2004

(54) FUZZY INFERENCE SYSTEM FOR SIMPLIFYING MESH

(75) Inventors: Chin-Chen Chang, Hsinchu (TW); Shu-Kai Yang, Tainan (TW); Ding-Zhou Duan, Kaohsiung (TW); Ming-Fen Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 350 days.

(21) Appl. No.: 09/741,612

(22) Filed: Dec. 19, 2000

(65) Prior Publication Data

US 2002/0042783 A1 Apr. 11, 2002

(30) Foreign Application Priority Data

Aug. 30, 2000 (TW) ........................ 89117571 A

(51) Int. Cl.[7] ..................... G06F 15/18; G06F 17/00
(52) U.S. Cl. ............................ 706/8; 706/47
(58) Field of Search ........................ 706/8, 47

(56) References Cited

U.S. PATENT DOCUMENTS

| | | | | |
|---|---|---|---|---|
| 5,537,514 A | * | 7/1996 | Nishidai | 706/52 |
| 5,566,072 A | * | 10/1996 | Momose et al. | 701/117 |
| 5,845,008 A | * | 12/1998 | Katoh et al. | 382/217 |

OTHER PUBLICATIONS

Eshera et al, "Parallel Rule–Based Fuzzy Inference of Mesh–Connected Systolic Arrays", IEEE Intelligent System, Winter 1989.*

* cited by examiner

*Primary Examiner*—George B. Davis
(74) *Attorney, Agent, or Firm*—J.C. Patents

(57) ABSTRACT

A method of operating a fuzzy inference system to simplify a mesh capable of producing a high-quality approximate mesh and retaining good characteristics and appearance so that a good visual effect emerges. The invention utilizes a fuzzy inference system to integrate mesh attributes and estimate the cost in removing certain data, which serve as a criteria for mesh simplification. Hence, the invention is suitable for progressive meshes, multiresolution modeling rendering and progressive transmission on a network.

20 Claims, 6 Drawing Sheets

FUZZY INFERENCE SYSTEM FOR SIMPLIFYING MESH

CROSS-REFERENCE TO RELATED APPLICATION

This application claims the priority benefit of Taiwan application serial no. 89117571, filed Aug. 30, 2000.

BACKGROUND OF THE INVENTION

1. Field of Invention

The present invention relates to a method for simplifying mesh. More particularly, the present invention relates to a fuzzy inference system capable of simplifying meshes in computer graphics by integrating variances of mesh attributes and estimating the cost of removing a portion of data.

2. Description of Related Art

Conventional mesh simplification techniques can be roughly divided into two types, namely, edge collapsing and vertex decimation. FIG. 1 is an illustration showing the working principles behind the conventional edge collapsing method for simplifying mesh. As shown in FIG. 1, vertices $(v_t, v_s)$ on the left side of the figure is chosen to be the edge collapsing vertices. After collapsing the edge between the vertice($v_t$, $v_s$), only a single vertex $v_{s'}$ is left. Hence, one vertex is eliminated and the triangles represented by the vertices($v_r$, $v_t$, $v_s$) and ($v_t$, $v_s$, $v_r$) are removed. Meanwhile, five edges including $v_rv_s$, $v_tv_l$, $v_tv_r$, $v_rv_s$, $v_sv_l$ originally on the left is reduced to just two edges, namely, $v_tv_{s'}$ and $v_{s'}v_{r'}$.

FIG. 2 is an illustration showing the working principles behind the conventional vertex decimation method for simplifying meshes. In the vertex decimation method, vertices are classified according to the geometry of its neighboring triangles. As shown in FIG. 2, vertices of secondary importance are removed (for example, $v_m$) and the 'hole' so created is again triangulated (to form triangles A1, A2 and A3). With such processing, the vertex $v_m$ on the left side of the figure is eliminated so that the original five triangles B1, B2, B3, B4, B5 are reduced to just three triangles A1, A2 and A3. Meanwhile, the five edges $v_mv_s$, $v_mv_t$, $v_mv_u$, $v_mv_v$, $v_mv_w$ on the left side of the figure are reduced to just two edges $v_sv_u$ and $v_sv_v$ on the right side of the figure.

In the two aforementioned methods, a lower resolution mesh is generated from a high resolution mesh. However, in the process of removing data (collapsing edges or decimating vertices), judging the importance of various attributes of the mesh and putting up a weight for each attribute is often very difficult. This process frequently leads to visual distortion of the mesh. In some cases, if the data chosen for removal is actually important, fundamental characteristics or external appearance may be changed or else the degree of simplification is quite limited. Hence, the method of picking up not-so-relevant data for deletion is a critical issue.

In general, the edge collapsing method shown in FIG. 1 is suitable mostly for geometric treatment with due consideration to the cost resulting from positional change. Other factors such as curvature change in neighboring triangles and color change are mostly ignored. As for the vertex decimation method shown in FIG. 2, the method is limited to applications on a curve surface. For a three-dimensional mesh, deletion of vertices will be very difficult. In addition, any sharp cornered section or important section must be heavily weighted. Hence, if there is no unified scheme for weighing the attributes of a particular mesh, the simplification process may lead to serious warping.

Since most mesh simplification techniques estimate the cost of removing part of the data by considering some of the attributes only, major visual effects, characteristics and external appearance of a mesh are only partially considered. Moreover, no definite rules can be found to measure the cost of the removed attributes. For example, length or distance between the desired-to-remove data positions can be used to estimate positional variation. Similarly, change in the desired-to-remove normal data can be used to measure curvature variation and difference between the desired-to-remove color data can be used to compute color variation. The three attributes need to be integrated and balanced so that a final cost for removing part of the data can be obtained. Due to the absence of definite rules or standards, attributes are often poorly integrated leading to the destruction of fundamental characteristics and the restriction of mesh simplification.

SUMMARY OF THE INVENTION

Accordingly, one object of the present invention is to provide a method of using a fuzzy inference system to simplify meshes in computer graphics. A fuzzy inference system is used to integrate all possible attributes, and then the cost of eliminating the desired-to-remove data is estimated. Thereafter, the attributes are integrated to obtain a balance so that a final cost for the desired-to-remove data is determined. The final cost serves as a criteria for simplifying the mesh. Hence, after the mesh is simplified, all the good characteristics and visual appearance are retained. The method is suitable for progressive meshing. The method can be applied to multiresolution modeling rendering such as virtual reality, multimedia, computer graphics, three-dimensional games and progressive transmission within a network.

To achieve these and other advantages and in accordance with the purpose of the invention, as embodied and broadly described herein, the invention provides a method of using a fuzzy inference system to simplify meshes. First, m attributes are selected for a particular mesh. Variation of each attribute $m_i$ is characterized by $n_1$ fuzzy sets, where $1 \leq i \leq m$. According to a fuzzy inference rule, variation of m attributes and the corresponding $n_i$ fuzzy sets, $n_1.n_2 \ldots n_m$ different combinations are formed. Using a first function, $n_1.n_2 \ldots n_m$ weights is computed from the $n_1.n_2 \ldots n_m$ different combinations. According to the fuzzy inference rule, variation of the m attributes is next computed using a second function to obtain $n_1.n_2 \ldots n_m$ output values. Finally, according to the $n_1.n_2 \ldots n_m$ weights and the $n_1.n_2 \ldots n_m$ output values estimated cost is obtained by computation using a third function. The estimated cost serves as a parameter for removing data when simplifying the mesh.

The TSK fuzzy inference system can be used as the fuzzy inference rule. The first function, with respect to the $n_1.n_2 \ldots n_m$ different combinations, can be defined in such a way that the one having the smallest membership value among the fuzzy sets that correspond to the variation of the m attributes is selected to obtain the $n_1.n. \ldots n_m$ weights. The second function, with respect to the $n_1.n. \ldots n_m$ different combinations, can be defined in such a way that cost of data removal, in other words, visual effects on the simplified mesh is selected to be the power of the variation of the m attributes followed by multiplying with each other, hence obtaining the $n_1.n_2 \ldots n_m$ output values. The third function can be defined as the computation of a weighed average.

The fuzzy-based inference mesh simplification method of this invention is not limited to using TSK fuzzy inference system. For example, common Mamdani fuzzy inference system, Tsukamotos fuzzy inference system and so on can also be used, as long as all attributes within a mesh is considered without any loss of generality.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
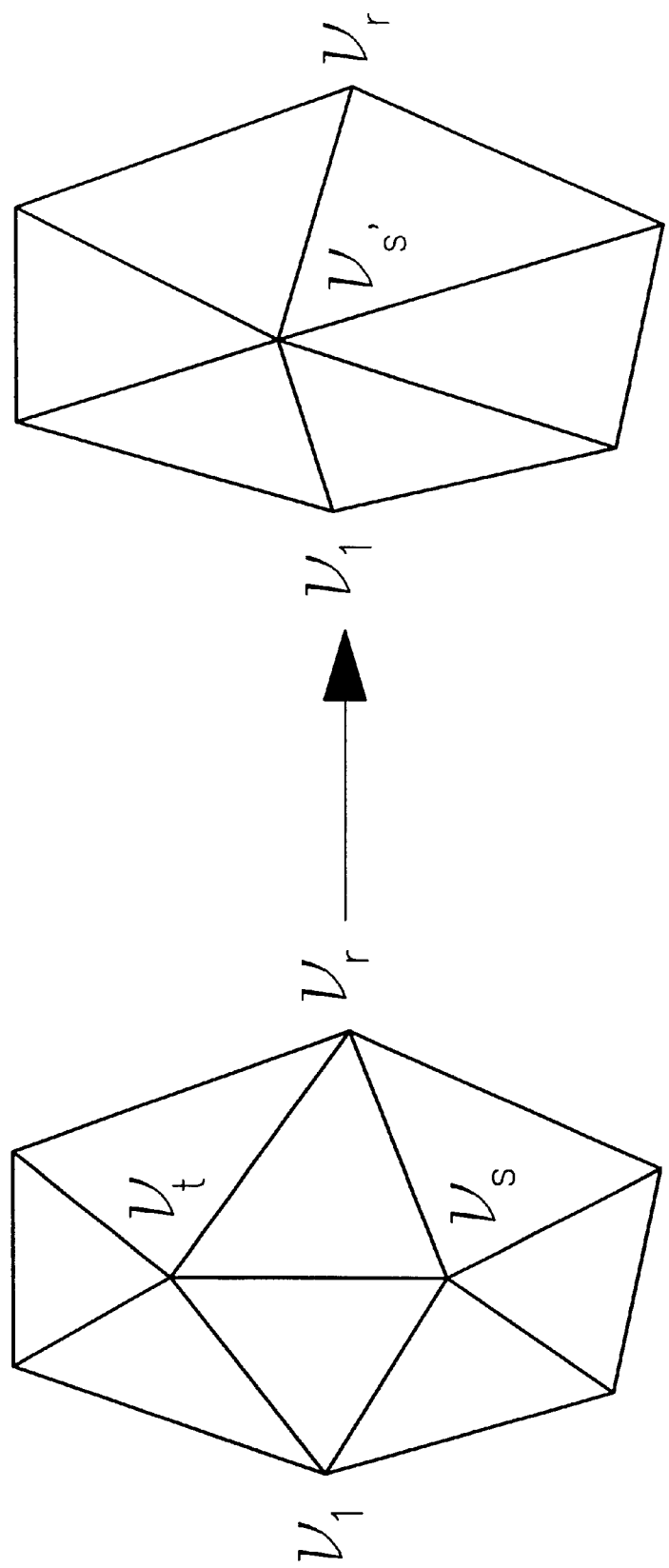
FIG. 1 is an illustration showing the working principles behind the conventional edge collapsing method for simplifying meshes.
Figure 2:
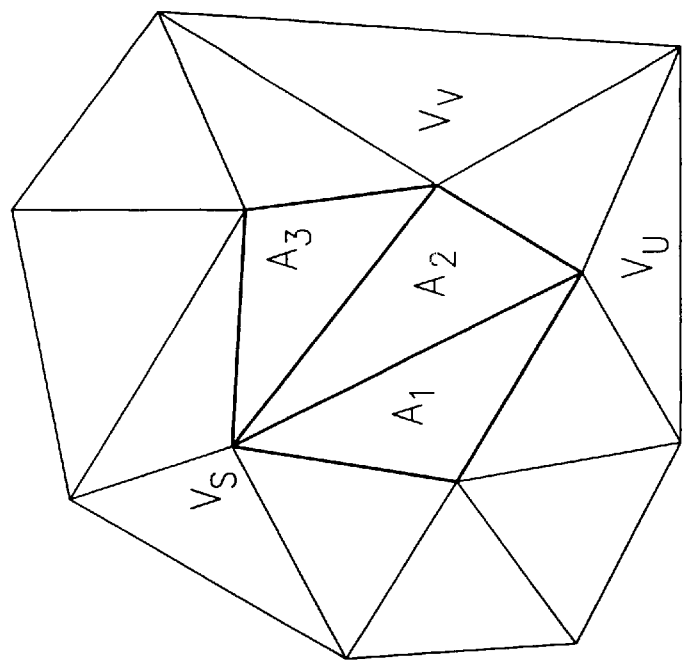
FIG. 2 is an illustration showing the working principles behind the conventional vertex decimation method for simplifying meshes.
Figure 2:
Figure 2:
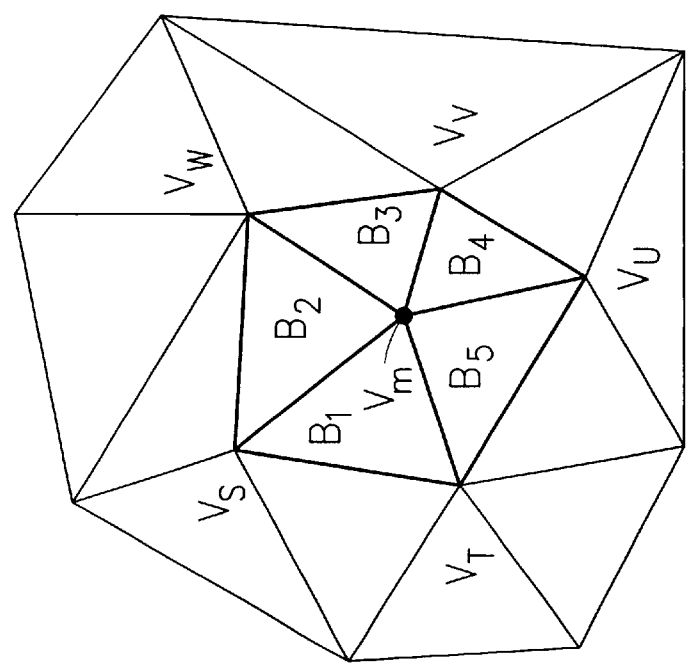

Reference will now be made in detail to the present preferred embodiments of the invention, examples of which are illustrated in the accompanying drawings. Wherever possible, the same reference numbers are used in the drawings and the description to refer to the same or like parts.

Since this invention uses fuzzy inference to carry out mesh simplification, a brief description of fuzzy set theory is introduced here. In a fuzzy set, an element may partially belong to a given set. Assume the universal set is X, a fuzzy set A can be defined as:

$u_A(x): X \rightarrow [0,1]$, where $u_A(x)$ is a membership function of the fuzzy set A. Membership function indicates the member grade of element x in the universal set X with the fuzzy set A. For example, if element x's membership function has a value of 1, this indicates that the element x belongs entirely to the fuzzy set A. If membership function of element x is zero, element x is absolutely and entirely outside the fuzzy set A. If membership function of element x is 0.5, say, this indicates that the degree of element x which belongs to the fuzzy set A is about 50%.

In a fuzzy inference system, a typical fuzzy if-then rule can be represented by:

if x is A then y is B, where if . . . is the antecedent part and then . . . is the consequent part, x and y are input variables, A and B are fuzzy sets.

The deployment of fuzzy if-then rules to produce inference is referred to as fuzzy reasoning. For example, direction of a car in motion may be controlled by fuzzy reasoning using fuzzy if-then rules as follows:

if the car deviates towards the right side, turn the wheel to the left, where car direction and the wheel are input variables while right and left is represented by fuzzy sets.

A number of fuzzy inference systems has been proposed and applied to different areas. The most common fuzzy inference system includes Mamdani's fuzzy inference system, Tsukamotos' fuzzy inference system and TSK fuzzy inference system. Theoretical concepts behind all these fuzzy inference systems are almost identical. Their difference lies, without loss of generality, mainly in the setup of fuzzy if-then rules, definition of the consequent part and the generation of the final output.

In this invention, a TSK fuzzy inference system is used, and hence the following is brief description of the TSK fuzzy inference system. The TSK fuzzy inference system is developed jointly by Takagi, Sugeno and Kang (TSK). The TSK system utilizes the following typical fuzzy if-then rule:

if x is A and y is B, then z equals f(x,y), where the antecedent part includes input variables x, y and fuzzy sets A, B, and the consequent part includes an output variable z, which is a function of the input variables x and y. The output variable z describes the result of the inference. If a system is meshed on a number of if-then rules, the final output is a weighed average of the outputs of all the fuzzy if-then rules. The weight of each if-then rule is applied to the input variables in the antecedent part. Utilizing the input variables, the smallest value among membership grades of the fuzzy set is picked up or obtained by multiplication.

Figure 3:
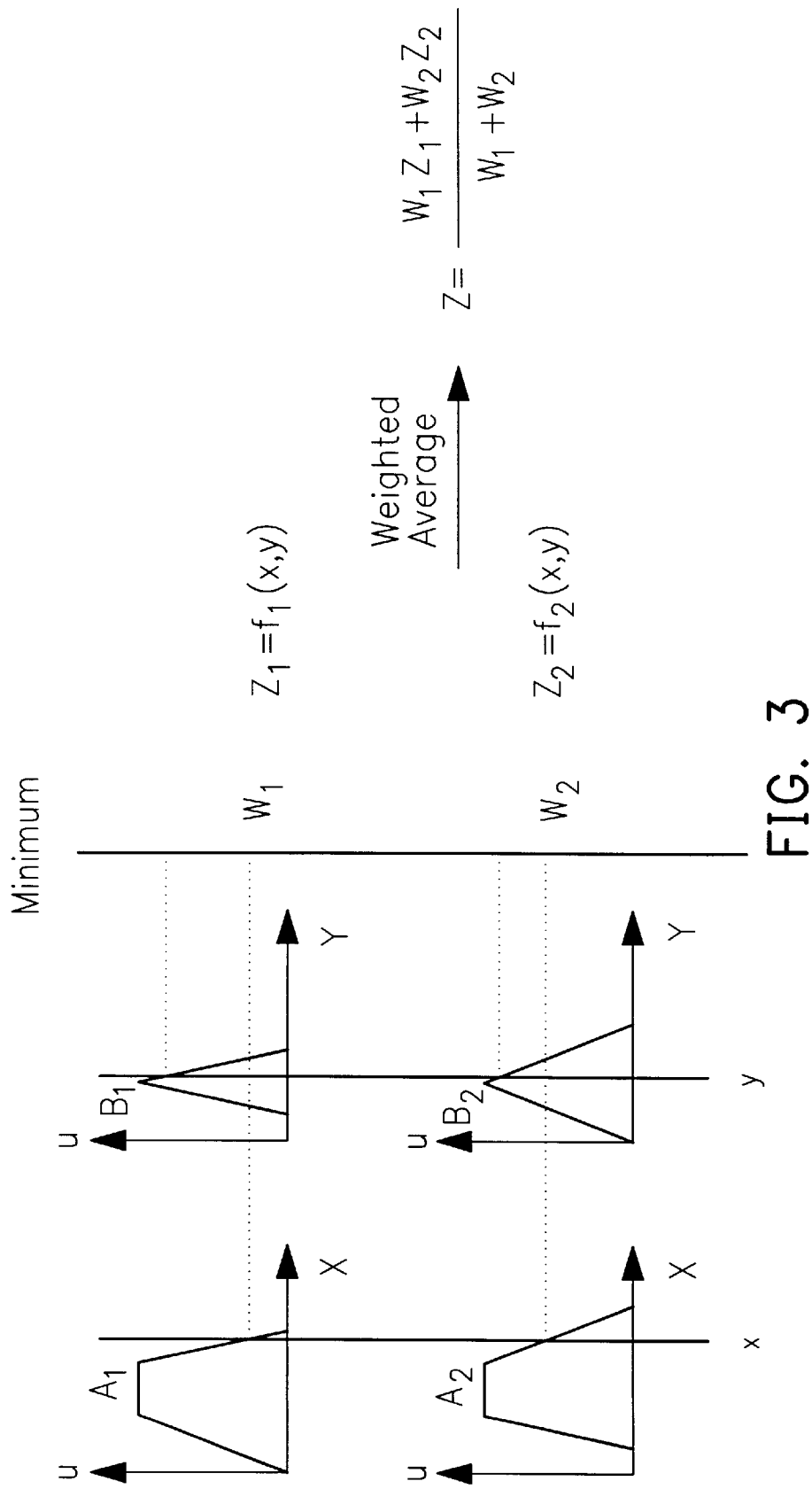
FIG. 3 is a diagram showing a TSK fuzzy inference system having two fuzzy if-then rules and two input variables.

FIG. 3 is a diagram showing a TSK fuzzy inference system having two fuzzy if-then rules and two input variables. The fuzzy if-then rules are defined:

(a) if x is $A_1$ and y is $B_1$, then $z_1$ is equal to $f_1(x, y)$; and (b) if x is $A_2$ and y is $B_2$, then $z_2$ is equal to $f_2(x, y)$, where the antecedent part includes input variables x, y and fuzzy sets $A_1$, $A_2$, $B_1$, $B_2$, the consequent part includes output variables $z_1$ and $z_2$. The weights $w_1$ and $w_2$ are in the antecedent part. The weights and the input variables together serve to pick out the smallest value among the membership grades in the fuzzy sets. Finally, the output value z is the weighed average of output values $z_1$ and $z_2$ and the weights $w_1$ and $w_2$ of each if-then rule.

In the following, an actual example is used to illustrate how a fuzzy inference system can be used to simplify mesh. In general, visual sensation, characteristics or overall appearance of a mesh can be characterized by three major attributes. First, three attributes for describing a particular mesh are selected for example, surface position, surface curvature and surface color. The cost of varying surface position can be estimated by the largest value of the distance between desired-to-remove data position. The cost of varying surface curvature can be estimated by the largest value of one minus the inner product of the desired-to-remove data normal. The cost of varying surface color can be estimated by the largest value of the distance between the desired-toremove data color. In here, distance variation between the desired-to-remove data position is a type of variation in surface position. Inner product variation between the desired-to-remove data normal is a type of variation in surface curvature. Distance variation between the desired-to-remove data color is a type of variation is surface color.

Figure 5:
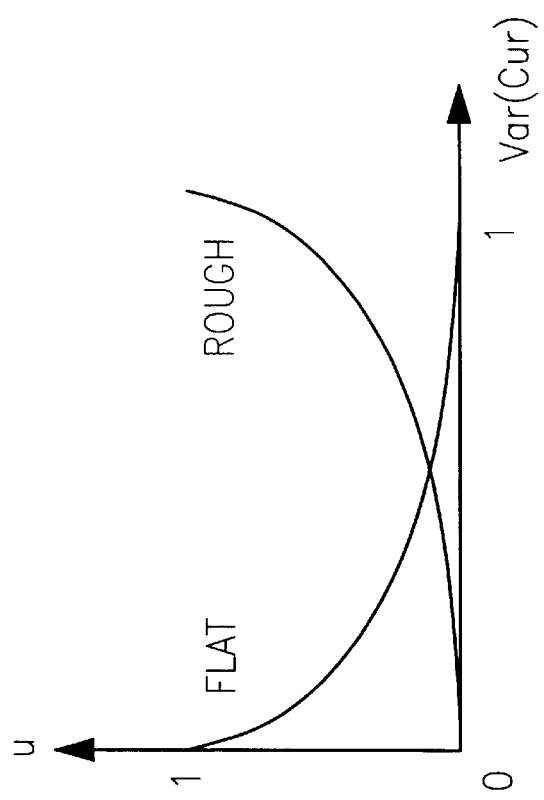
FIG. 5 is a graph showing variation of surface curvature characterized by fuzzy sets (FLAT) and (ROUGH) using a fuzzy inference mesh simplification method according to this invention.
Figure 4:
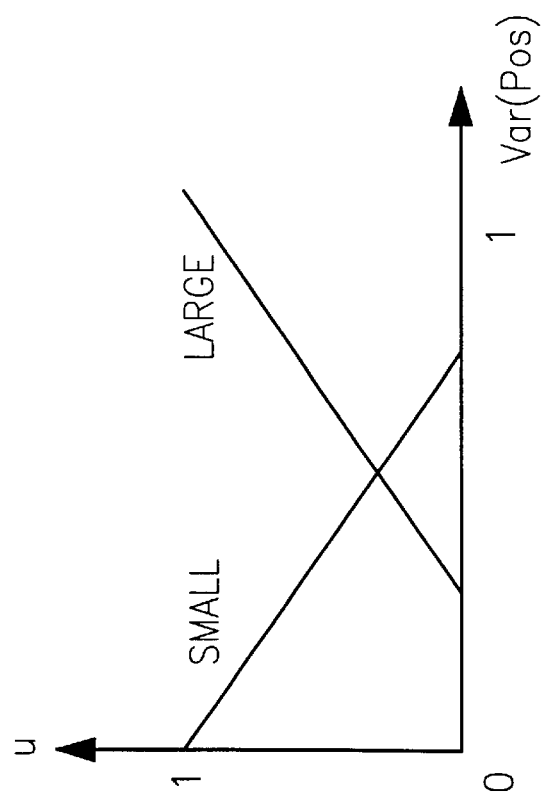
FIG. 4 is a graph showing variation of surface position characterized by fuzzy sets (SMALL) and (LARGE) using a fuzzy inference mesh simplification method according to this invention.
Figure 6:
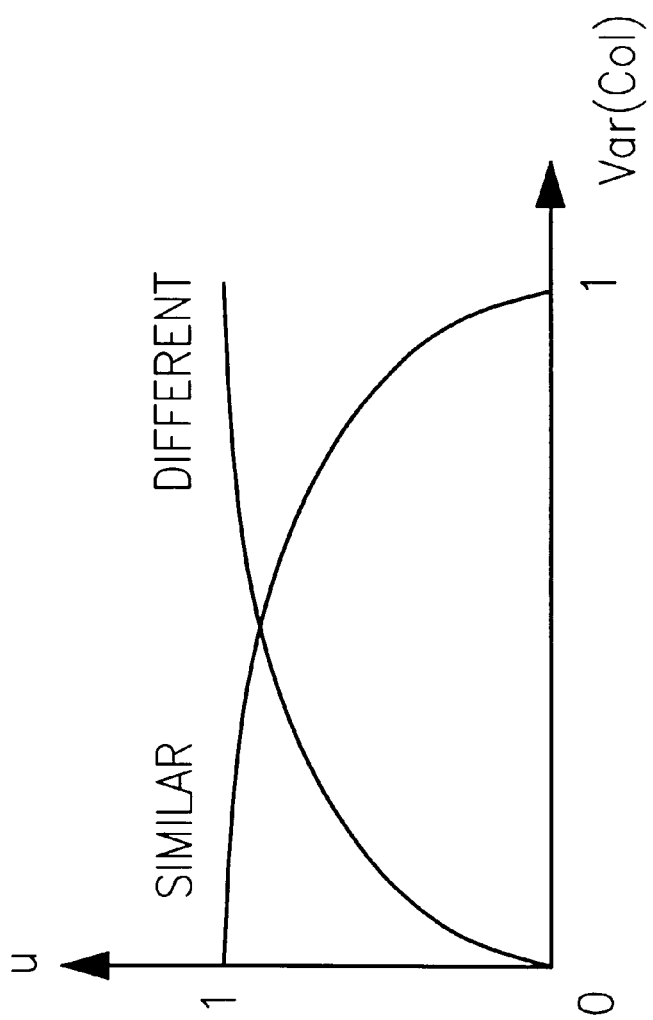
FIG. 6 is a graph showing variation of surface color characterized by fuzzy sets (SIMILAR) and (DIFFERENT) using a fuzzy inference mesh simplification method according to this invention.

The following is the characterization of each of the three attributes using two fuzzy sets. For example, variation in surface position is characterized by fuzzy sets (SMALL) and (LARGE), variation in surface curvature is characterized by fuzzy sets (FLAT) and (ROUGH), and variation in surface color is characterized by fuzzy sets (SIMILAR) and (DIFFERENT). The membership functions representing the variation in fuzzy sets of the above three attributes are shown in FIGS. 4, 5 and 6 respectively. To simplify description, the universal set of the fuzzy sets is normalized so that the resulting output fall within the range [0,1].

In the following, variation of the desired-to-remove data surface position is represented by Var(Pos), variation of the desired-to-remove data surface curvature is represented by Var(Cur) and variation of the desired-to-remove data surface color is represented by Var(Col). In the embodiment of this invention, assume the cost of variation of surface position is estimated using the largest distance between the desired-to-remove data position, the cost of variation of surface curvature is estimated using the largest value of one minus the inner product between the desired-to-remove data normal and the cost of variation of surface color is estimated using the largest distance between the desired-to-remove data color. If the result of computation gives Var(Pos) a value of 0.75, Var(Cur) a value of 0.5 and Var(Col) a value of 0.75, membership value for the SMALL and the LARGE fuzzy set according to FIG. 4 (for a Var(Pos) of 0.75) is 0.1 and 0.6, membership value for the FLAT and ROUGH fuzzy set according to FIG. 5 (for a Var(Cur) of 0.5) is 0.3 and 0.3, and membership value for the SIMILAR and DIFFERENT fuzzy set according to FIG. 6 (for a Var(Col) of 0.75) is 0.9 and 0.65, respectively.

Figure 7:
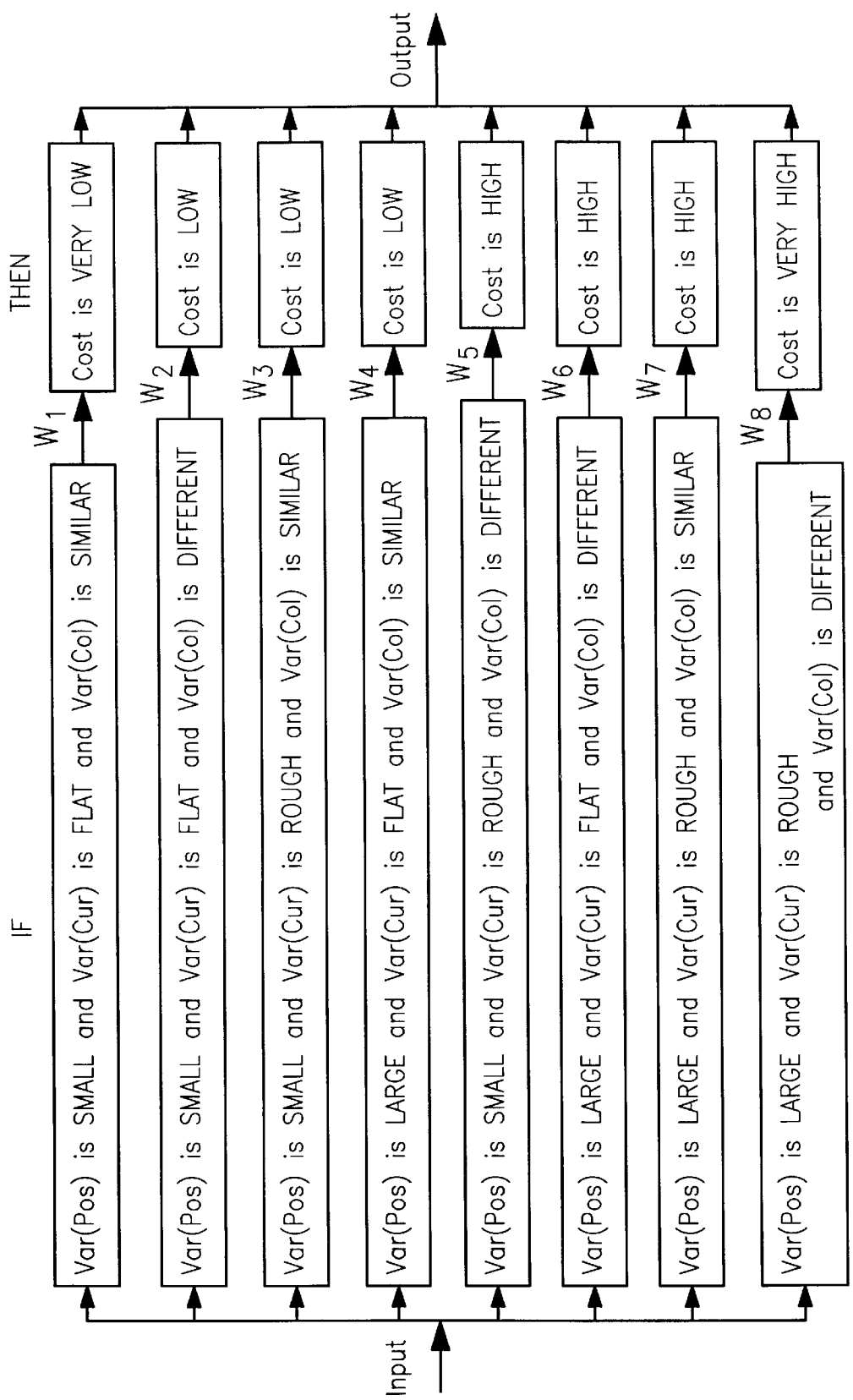
FIG. 7 is a diagram showing the entire fuzzy inference system for mesh simplification according to this invention.

FIG. 7 is a diagram showing the entire fuzzy inference system for mesh simplification according to this invention. Because there are three attributes altogether with variation of the three attributes characterized by two fuzzy sets, a total of 2·2·2 or 8 fuzzy if-then rules (also shown in FIG. 7) are required written below:

(1): If Var(Pos) is SMALL and Var(Cur) is FLAT and Var(Col) is SIMILAR, then $z_1$ is $f_1(\bullet)$;

(2): If Var(Pos) is SMALL and Var(Cur) is FLAT and Var(Col) is DIFFERENT, then $z_2$ is $f_2(\bullet)$;

(3): If Var(Pos) is SMALL and Var(Cur) is ROUGH and Var(Col) is SIMILAR, then $z_3$ is $f_3(\bullet)$;

(4): If Var(Pos) is LARGE and Var(Cur) is FLAT and Var(Col) is SIMILAR, then $z_4$ is $f_4(\bullet)$;

(5): If Var(Pos) is SMALL and Var(Cur) is ROUGH and Var(Col) is DIFFERENT, then $z_5$ is $f_5(\bullet)$;

(6): If Var(Pos) is LARGE and Var(Cur) is FLAT and Var(Col) is DIFFERENT, then $z_6$ is $f_6(\bullet)$;

(7): If Var(Pos) is LARGE and Var(Cur) is ROUGH and Var(Col) is DIFFERENT, then $z_7$ is $f_7(\bullet)$;

(8): If Var(Pos) is LARGE and Var(Cur) is ROUGH and Var(Col) is DIFFERENT, then $z_8$ is $f_8(\bullet)$.

Utilizing fuzzy inference rules, altogether eight combinations of the attributes are formed. The weights $w_1, w_2, \ldots, w_8$ in the antecedent part are applied to each if-then rule. Using the variation of the three attributes as variables in the first function, the smallest value in the membership of the fuzzy sets is selected according to the input variables. Ultimately, eight different weights from eight different combinations are obtained.

Hence, when Var(Pos) is 0.75 and membership values for SMALL and LARGE fuzzy sets are 0.1 and 0.6, Var(Cur) is 0.5 and membership values for FLAT and ROUGH fuzzy sets are 0.3 and 0.3, and Var(Col) is 0.25 and membership values for SIMILAR and DIFFERENT fuzzy sets are 0.9 and 0.65, the weights are respectively $w_1$=0.1 (min{0.1, 0.3, 0.9}, $w_2$=0.1 (min{0.1, 0.3, 0.65}), $w_3$=0.1 (min{0.1, 0.3, 0.9}), $w_4$=0.3 (min{0.6, 0.3, 0.9}), $w_5$=0.1 (min{0.1, 0.3, 0.65}), $w_6$=0.3 (min{0.6, 0.3, 0.65}), $w_7$=0.3 (min{0.6, 0.3, 0.9}) and $w_8$=0.3 (min{0.6, 0.3, 0.65}).

According to the fuzzy inference rules (fuzzy if-then rules) and the three variable attributes Var(Pos), Var(Cur), Var(Col), output functions are defined to be $z_i=f_i$(Var(Pos), Var(Cur), Var(Col)) (in the following, (Var(Pos), Var(Cur), Var(Col)) is represented by ($\bullet$)), wherein $f_1(\bullet)$ represents the cost of removing the data is very low, $f_2(\bullet)$ and $f_3(\bullet)$ and $f_4(\bullet)$ represents the cost of removing the data is low, $f_5(\bullet)$ and $f_6(\bullet)$ and $f_7(\bullet)$ represents the cost of removing the data is high, $f_8(\bullet)$ represents the cost of removing the data is very high. The command function $f_i$(Var(Pos), Var(Cur), Var(Col)) is defined as follows: $f_i$(Var(Pos), Var(Cur), Var(Col))=(Var(Pos))$^p$·(Var(Cur))$^q$·(Var(Col))$^r$ where i and p, q and r are set according to the following table:

| i | p | q | r |
|---|---|---|---|
| 1 | 5 | 5 | 5 |
| 2 | 2 | 2 | 2 |
| 3 | 2 | 2 | 2 |
| 4 | 2 | 2 | 2 |
| 5 | 0.5 | 0.5 | 0.5 |
| 6 | 0.5 | 0.5 | 0.5 |
| 7 | 0.5 | 0.5 | 0.5 |
| 8 | 0.2 | 0.2 | 0.2 |

In the above table, the larger the value of p, q and r, the lower is the cost of removing data and the smaller is the visual effect on the simplified mesh. Conversely, the smaller the value of p, q and r, the higher is the cost of removing data and the greater is the visual effect on the simplified mesh.

The values encoded in Var(Pos), Var(Cur), Var(Col) together with the power of p, q and r listed in the above table produce the power of the variation of the three attributes. The three parameters p, q and r is capable of forming eight different combinations that determine the cost of removing data. In other words, from the visual effect of mesh simplification, the output of each fuzzy if-then rule are as follows: $z_1$=0.00001, $z_2$=0.00879, $z_3$=0.00879, $z_4$=0.00879, $z_5$=0.30617, $z_6$=0.30617, $z_7$=30617, $z_8$=0.62322.

Finally, according to the eight weights and the eight outputs, a weighed average is computed out to obtain a cost estimation. The weighed average is used for estimating the cost of removing data during mesh simplification. For example, the final output z is 0.25355 according to the embodiment of this invention. Thereafter, the final output z is compared with other output section for carrying out data removal and mesh simplification.

The advantage of the embodiment is that during the process of simplifying the mesh, attribute variation of the mesh is described using fuzzy concept. Furthermore, with the application of fuzzy inference rules, the variation of attributes are integrated together and a cost for removing data is estimated. The cost forms a criteria for carrying out subsequent simplification of the mesh.

However, in computing the cost of removing data of each variable attribute, there is no standard mathematical formula or rule. The only constraint is to satisfy the degree of variation of the attributes. Hence, the estimation of the cost of removing some data is based on the variation of each attribute. Newer computation method for estimating the cost of removing data in each variable attribute is also possible.

In addition, this invention can use many different fuzzy sets to describe the characteristics of the to-be-removed data in each attribute. Such an arrangement is more suited to the variation of the to-be-removed data attributes. Moreover, the final cost produced by the to-be-removed data is obtained by performing a weight averaging computation using the output from each if-then rule and the weights. The weights are in the antecedent part of the fuzzy if-then rule. The weights are obtained by choosing the smallest value of the membership in the fuzzy sets according to the input variables. Hence, the use of random input values according to user's rule of thumb can be prevented.

The invention is no limited to three attributes. For example, m attributes may contribute to the visual, the characteristic and the external appearance of a mesh. The m attributes can be represented using symbols $F_1, F_2, \ldots, F_m$. The variation of to-be-removed data in each attribute can be considered (represented by $Var(F_1), Var(F_2), \ldots, Var(F_m)$). The variation of to-be-removed data in each attribute $F_i$ is next characterized by $n_i$ fuzzy sets represented by $A_1(F_1)$, $A_2(F_2), A_3(F_3), \ldots, A_{n_i}(F_i)$ with $1<=i<=m$. Each fuzzy set is described by a membership function. The final cost of to-be-removed data is represented by function $z_k=f_k(Var(F_1), Var(F_2), \ldots, Var(F_m))$. The fuzzy if-then rule is defined as follows:

if $Var(F_1)$ is $A_j(F_1)$ and $Var(F_2)$ is $A_j(F_2), \ldots,$ and $Var(F_m)$ is $A_j(F_m)$, then $z_k$ is $f_k(\bullet)$.

There are altogether $n_1.n_2 \ldots n_m$ fuzzy if-then rules, wherein $f_k(\bullet)$ represents $f_k(Var(F_1), Var(F_2), \ldots, Var(F_m))$. In the antecedent part, $Var(F_1), Var(F_2), \ldots, Var(F_m)$ are the input variables, $A_j(F_1), A_j(F_2), \ldots A_j(F_m)$ are the fuzzy sets. In the consequent part, $z_k$ is the output. The output $z_k$ is a function of variables $Var(F_1), Var(F_2), \ldots, Var(F_m)$ that describe cost of removing data. The final output z is a weighed average of all the $z_k$ outputs obtained from the fuzzy if-then rules. The weight $w_k$ of each fuzzy if-then rule is in the antecedent part. The weights $w_k$ together with the fuzzy if-then rules enable the selection of the smallest value of membership grades of the fuzzy sets according to the input variables.

If the cost of removing data for each of the attribute is high, possibility of removing the data is low. On the other hand, if the cost of removing data for each of the attribute is low, feasibility of removing data is high. This type of inference obtained through the integration of all attributes permits an estimation of the cost for data removal and hence provides a reliable reference.

In summary, this invention provides a method of simplifying a mesh using a fuzzy inference system. Using a fuzzy inference system, cost of removing certain data in a mesh can be accurately estimated so that the ultimate shape, character and appearance of the mesh can be maintained.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of operating a fuzzy inference system for simplifying mesh in computational data processing, comprising the steps of:

selecting m attributes of a mesh;

characterizing the variation of each attribute $m_i$ attributes using $n_i$ fuzzy sets, where $1 \leq i \leq m$;

forming $n_1.n_2 \ldots n_m$ different combinations using the variations of the m attributes and their corresponding $n_i$ fuzzy sets according to fuzzy inference rules, and then generating $n_1.n_2 \ldots n_m$ weights of the $n_1.n_2 \ldots n_m$ different combinations through a first function;

performing a second functional evaluation of the variation of the m attributes according to the fuzzy inference rule to obtain $n_1.n_2 \ldots n_m$ output values; and performing a third functional evaluation using the $n_1.n_2 \ldots n_m$ weights and the $n_1.n_2 \ldots n_m$ output values to obtain a cost estimation that can serve as a criteria for simplifying a mesh through data removal.

2. The method of claim 1, wherein the fuzzy inference rules include the rules in a TSK fuzzy inference system.

3. The method of claim 1, wherein the first function, with respect to the $n_1.n_2 \ldots n_m$ different combinations, picks up the smallest value in the membership of the fuzzy sets that correspond to the variation of the m attributes to form the $n_1.n_2 \ldots n_m$ weights.

4. The method of claim 3, wherein the second function, with respect to the $n_1.n_2 \ldots n_m$ different combinations, picks up the value of the visual effect due to mesh simplification to become the value for the power of the variation of the m attributes and then multiplied together to obtain the $n_1.n_2 \ldots n_m$ output values.

5. The method of claim 4, wherein the third functional evaluation is a weighted average calculation.

6. The method of claim 3, wherein the third functional evaluation is a weighted average calculation.

7. The method of claim 1, wherein the third functional evaluation is a weighted average calculation.

8. The method of claim 1, wherein m=3 and $n_i$=2.

9. The method of claim 8, wherein the m attributes includes a surface position, a surface curvature and a surface color.

10. The method of claim 9, wherein the variation of surface curvature is characterized by fuzzy sets 'FLAT' and 'ROUGH'.

11. The method of claim 10, wherein the variation of surface color is characterized by fuzzy sets 'SIMILAR' and 'DIFFERENT'.

12. The method of claim 9, wherein the variation of surface position is characterized by fuzzy sets 'SMALL' and 'LARGE'.

13. The method of claim 12, wherein the variation of surface curvature is characterized by fuzzy sets 'FLAT' and 'ROUGH'.

14. The method of claim 13, wherein the variation of surface color is characterized by fuzzy sets 'SIMILAR' and 'DIFFERENT'.

15. The method of claim 12, wherein the variation of surface color is characterized by fuzzy sets 'SIMILAR' and 'DIFFERENT'.

16. The method of claim 9, wherein the variation of surface color is characterized by fuzzy sets 'SIMILAR' and 'DIFFERENT'.

17. The method of claim 1, wherein the computational data processing comprises computer graphics.

18. The method of claim 1, wherein the computational data processing comprises multimedia.

19. The method of claim 1, wherein the computational data processing comprises three-dimensional game.

20. The method of claim 1, wherein the computational data processing comprises progressive transmission on a network.

* * * * *